United States Patent
Uemura

(10) Patent No.: US 11,169,512 B2
(45) Date of Patent: Nov. 9, 2021

(54) OPERATION MONITORING DEVICE AND A CONTROL PROGRAM THEREFOR

(71) Applicant: OKUMA Corporation, Aichi (JP)

(72) Inventor: Shinji Uemura, Niwa-gun Aichi (JP)

(73) Assignee: OKUMA CORPORATION, Aichi (JP)

( * ) Notice: Subject to any disclaimer, the term of this patent is extended or adjusted under 35 U.S.C. 154(b) by 425 days.

(21) Appl. No.: 15/985,986

(22) Filed: May 22, 2018

(65) Prior Publication Data
US 2018/0335770 A1 Nov. 22, 2018

(30) Foreign Application Priority Data

May 22, 2017 (JP) .................................. 2017-101216
Sep. 14, 2017 (JP) .............................. JP2017-177096

(51) Int. Cl.
*G05B 23/02* (2006.01)
*G05B 19/4063* (2006.01)
*G06Q 10/06* (2012.01)
*G06Q 10/00* (2012.01)

(52) U.S. Cl.
CPC ..... *G05B 23/0229* (2013.01); *G05B 19/4063* (2013.01); *G05B 23/0272* (2013.01); *G06Q 10/0639* (2013.01); *G06Q 10/20* (2013.01)

(58) Field of Classification Search
CPC .......................... G05B 23/0229; G05B 19/4063
See application file for complete search history.

(56) References Cited

U.S. PATENT DOCUMENTS

| 5,566,092 A * | 10/1996 | Wang ...................... G07C 3/00 |
|---|---|---|
| | | 702/185 |
| 7,043,403 B1 * | 5/2006 | Wang ................... G05B 23/024 |
| | | 702/182 |
| 2008/0168016 A1 * | 7/2008 | Sekiai .................... G05B 17/02 |
| | | 706/46 |

(Continued)

FOREIGN PATENT DOCUMENTS

| JP | H06110529 A | 4/1994 |
|---|---|---|
| JP | H06138931 A | 5/1994 |

(Continued)

OTHER PUBLICATIONS

JPO Notice of Reasons for Refusal for corresponding JP Application No. 2017-177096; dated Mar. 2, 2021.

(Continued)

*Primary Examiner* — Lisa E Peters
(74) *Attorney, Agent, or Firm* — Cantor Colburn LLP

(57) ABSTRACT

An operation monitoring device includes an analytical data obtaining unit for obtaining analytical data that contain history information of a machine; a non-operation reason analysis unit for analyzing the state of the machine by classifying the state of the machine for every predetermined time as either of an operating state and a plurality of kinds of non-operating states, based on the analytical data, the operating state being a state in which the machine is operating, and the non-operating states being classified based on a reason for non-operation; a storage unit for storing an analysis result storage database that stores the result of analysis; a display unit for presenting to a user the result of the analysis; and a correction unit for correcting the result of the analysis according to an instruction from the user.

7 Claims, 7 Drawing Sheets

(56) References Cited

U.S. PATENT DOCUMENTS

| | | | | |
|---|---|---|---|---|
| 2012/0084030 A1* | 4/2012 | Kitagawa | ............... | G05B 15/02 |
| | | | | 702/61 |
| 2015/0113329 A1* | 4/2015 | Kato | ................. | G06F 11/079 |
| | | | | 714/37 |
| 2017/0023927 A1* | 1/2017 | Kaushal | ............. | G05B 19/4065 |
| 2019/0339680 A1* | 11/2019 | Aota | ................. | G05B 23/0286 |

FOREIGN PATENT DOCUMENTS

| | | |
|---|---|---|
| JP | H07104838 A | 4/1995 |
| JP | H07296208 A | 11/1995 |
| JP | 2001075644 A | 3/2001 |
| JP | 2004326297 A | 11/2004 |

OTHER PUBLICATIONS

JPO Notice of Reasons for Refusal corresponding to JP Patent Application. No. 2017-177096; dated Nov. 4, 2020.

\* cited by examiner

|  | CLASSIFIED RESULT | | UPDATE RESULT | |
|---|---|---|---|---|
|  | [HH:MM] | [%] | [HH:MM] | [%] |
| OPERATING | 2:40 | 44.2% | 2:24 | 39.8% |
| WORKPIECE SET-UP | 0:46 | 12.7% | 0:37 | 10.2% |
| TOOL SET-UP | 0:33 | 9.1% | 0:33 | 9.1% |
| JIG SET-UP | 0:00 | 0.0% | 0:00 | 0.0% |
| PROGRAM PREPARATION | 0:00 | 0.0% | 0:25 | 6.9% |
| HALT IN PROCESSING | 0:26 | 7.2% | 0:26 | 7.2% |
| ABSENCE OF OPERATOR | 1:37 | 26.8% | 1:37 | 26.8% |
| OTHERS | 0:00 | 0.0% | 0:00 | 0.0% |

FIG. 3

| START | END | CLASSIFICATION | REASON FOR HALT (COMMENT) |
|---|---|---|---|
| 11:15:00 | 11:30:00 | OPERATING | OPERATION RESULT DATA ARE TRUE |
| 13:50:00 | 14:15:00 | PROGRAM PREPARATION | VERIFY MACRO |
| | | | |
| | | | |
| | | | |
| | | | |
| | | | |
| | | | |
| | | | |

FIG. 5

| OPERATION RESULT | [HH:MM] | [%] |
|---|---|---|
| OPERATING PERIOD | 3:16 | 54.1% |
| ALARMING PERIOD | 2:02 | 33.7% |
| HALT PERIOD | 0:44 | 12.2% |

FIG. 8

<Prior Art>

OPERATION MONITORING DEVICE AND A CONTROL PROGRAM THEREFOR

CROSS REFERENCE TO RELATED APPLICATION

The present application claims priority under 35 U.S.C. § 119 to Japanese Patent Application Nos. 2017-101216 filed on May 22, 2017 and 2017-177096 filed on Sep. 14, 2017, the entire content of which are incorporated herein by reference.

TECHNICAL FIELD

This specification discloses an operation monitoring device and a control program for the operation monitoring device.

BACKGROUND

For enhancement of the rate of operation of various machines in factories or the like, precise understanding of the current situation and adoption of measures; that is, utilization of the so-called See-Think-Plan-Do cycle, is important. For this purpose, factory operation monitoring devices are commercially available from various companies as a solution to the "See" step of the cycle.

Unfortunately, currently available factory operation monitoring devices can provide only limited information, such as "alarm stopped," "halt," "operating," and so forth. FIG. 8 and FIG. 9 illustrate information provided by conventional factory operation monitoring devices. Specifically, FIG. 8 illustrates a table showing the percentages of an operating period, an alarming period, and a halt period, and FIG. 9 illustrates in which of the states; namely, an operating state, a halt state, and an alarming state, a machine is in at each predetermined time.

Studies by the applicants of this specification verify that, in fact, an operating period; that is, a period of time during which machines can operate, includes loss due to wait, loss due to halt, and loss due to set-up.

These are loses accounted mainly as loss due to non-operation of a machine. Further studies prove that loss due to wait includes one due to wait for a workpiece, one due to absence of an operator, and one due to wait for a jig, a tool, or a program, that loss due to halt includes one due to deficiency of a machine, and that loss due to set-up includes one due to preparation of a jig or a tool, one due to preparation of a program, and one due to attachment/removal of a workpiece. The applicants suggest that information on the state of operation is obtained based on the time, or the on or off time, when such a state starts or ends and then manipulated by a user so that detailed information can be presented.

CITATION LIST

Patent Literature

Patent Document 1: JP H06-110529 A
Patent Document 2: JP H06-138931 A

Unfortunately, information that can be automatically analyzed and presented by the currently available factory operation monitoring devices is limited to "alarm stopped," "halt," "operating," and the like. Although these can make a trigger for improvement, the current situation is that more detailed information is necessary for precise understanding of the actual situation at the "See" step, which is important to utilize the above-mentioned cycle.

Patent Document 2 discloses a device that manages operation information of numerical control devices. The device can measure, for example, an energizing period, an operating period, and a non-operating period of a numerical control device and provide the result of measurement to a user. In presentation, the non-operating period is presented for every reason for non-operation. Specifically, according to Patent Document 2, an on-line set-up period, a wait period, a period without operator, and other periods are separately presented to a user.

The device disclosed in Patent Document 2 includes a non-operation reason determination rule storage unit that stores rules for determining a reason why a numeric control device is not operating. The device determines a specific non-operation reason, with reference to the rule, based on a signal concerning the state of the numerical control device, and recognizes the respective times, or the on and off respective times, at which the numerical control machine enters, and exits from, a non-operating state due to the reason specified. Rules for determining a non-operation reason may include, for example, (1) in the case where a function key assigned to a non-operation reason is pressed, the non-operation reason assigned is specified, (2) in the case where a key other than an activation button and function keys is pressed, "an on-line set-up period" is specified, (3) in the case where a chuck remains in an open state for sixty seconds, "a wait period" is specified, (4) in the case where there is a period with no key entry lasting for sixty seconds or longer, "a period without operator" is specified, and (5) in the case other than the above, "other period" is specified.

According to the device disclosed in Patent Document 2, a non-operating period is displayed for every non-operation reason, and the reason for the non-operation is automatically determined. This enables understanding of the operation state of a machine in response to a simple operation. Unfortunately, according to the device disclosed in Patent Document 2, the non-operation reason is very roughly selected in cases other than a case in which a function key is pressed, and the probability is not sufficiently high. Further, according to the device disclosed in Patent Document 2, the reason automatically determined by the device cannot be corrected later by a user. This leads to a problem of low accuracy of the operation information outputted by the device according to Patent Document 2.

The present specification discloses a technique that can explore operation information and present the same in a visible manner in order to further encourage activities to enhance the rate of operation of machines. Specifically, the specification discloses a technique for breaking down each of the conventionally available pieces of information, such as "alarm stopped," "halt," and "operating," into details to present in a visible manner to readily relay to the subsequent process of Think-Plan-Do. More specifically, the specification discloses an operation monitoring device capable of accurate management of the states of machines.

SUMMARY

In order to achieve the above described object, according to one aspect of the present invention, there is provided an operation monitoring device for managing the state of a machine, including: an analytical data obtaining unit for obtaining analytical data that contains history information of the machine; a non-operation reason analysis unit for analyzing the state of the machine by classifying the state of the machine for every predetermined time as either of an operating state and a plurality of kinds of non-operating states, based on the analytical data, the operating state being a state in which the machine is operating, the non-operating states being classified based on a reason for non-operation; a storage unit for storing an analysis result storage database that stores the result of analysis performed by the non-operation reason analysis unit; an output unit for presenting to a user the result of the analysis stored in the analysis result storage database; and a correction unit for correcting the result of the analysis stored in the analysis result storage database according to an instruction from the user.

According to another aspect of the present invention, there is provided an operation monitoring device for managing the state of a machine, including: a storage unit; an output unit for outputting information to a user; an input unit for receiving an operation from the user; and a control unit, wherein the control unit obtains analytical data that contains history information on the machine, and analyzing the state of the machine by classifying the state of the machine for every predetermined time as either of an operating state and a plurality of kinds of non-operating states, based on the analytical data, the operating state being a state in which the machine is operating, the non-operating states being classified based on a reason for non-operation, stores an analysis result storage database that stores the result of analysis in the storage unit, presents the result of analysis stored in the storage unit to the user via the output unit, and corrects the result of the analysis stored in the storage unit according to an instruction inputted from the user via an input unit.

According to still another aspect of the present invention, there is provided a control program of an operation monitoring device for managing the state of a machine, the control program for causing the computer to execute: a step of obtaining analytical data that contains history information on the machine; a step of analyzing the state of the machine by classifying the state of the machine for every predetermined time as either of an operating state and a plurality of kinds of non-operating states, based on the analytical data, the operating state being a state in which the machine is operating, the non-operating states being classified based on a reason for non-operation; a step of storing the result of analysis in a storage unit; a step of presenting the result of the analysis stored in the storage unit to a user via the output unit; and a step of correcting the result of the analysis stored in the storage unit according to an instruction from the user.

According to the operation monitoring device and the control program disclosed in this specification, it is possible to explore the state of a machine without a user's analysis for details and to present the information on the state in a visible manner.

BRIEF DESCRIPTION OF THE DRAWINGS

Embodiment(s) of the present disclosure will be described by reference to the following figures, wherein:

FIG. 3 illustrates an example of display of the result of analysis performed by an operation monitoring device;

FIG. 5 illustrates a table showing a part of correction manually performed by a user to the result illustrated in FIG. 4;

FIG. 8 illustrate a table showing the result of analysis performed by a conventional factory operation monitoring device.

DESCRIPTION OF EMBODIMENTS

Figure 1:
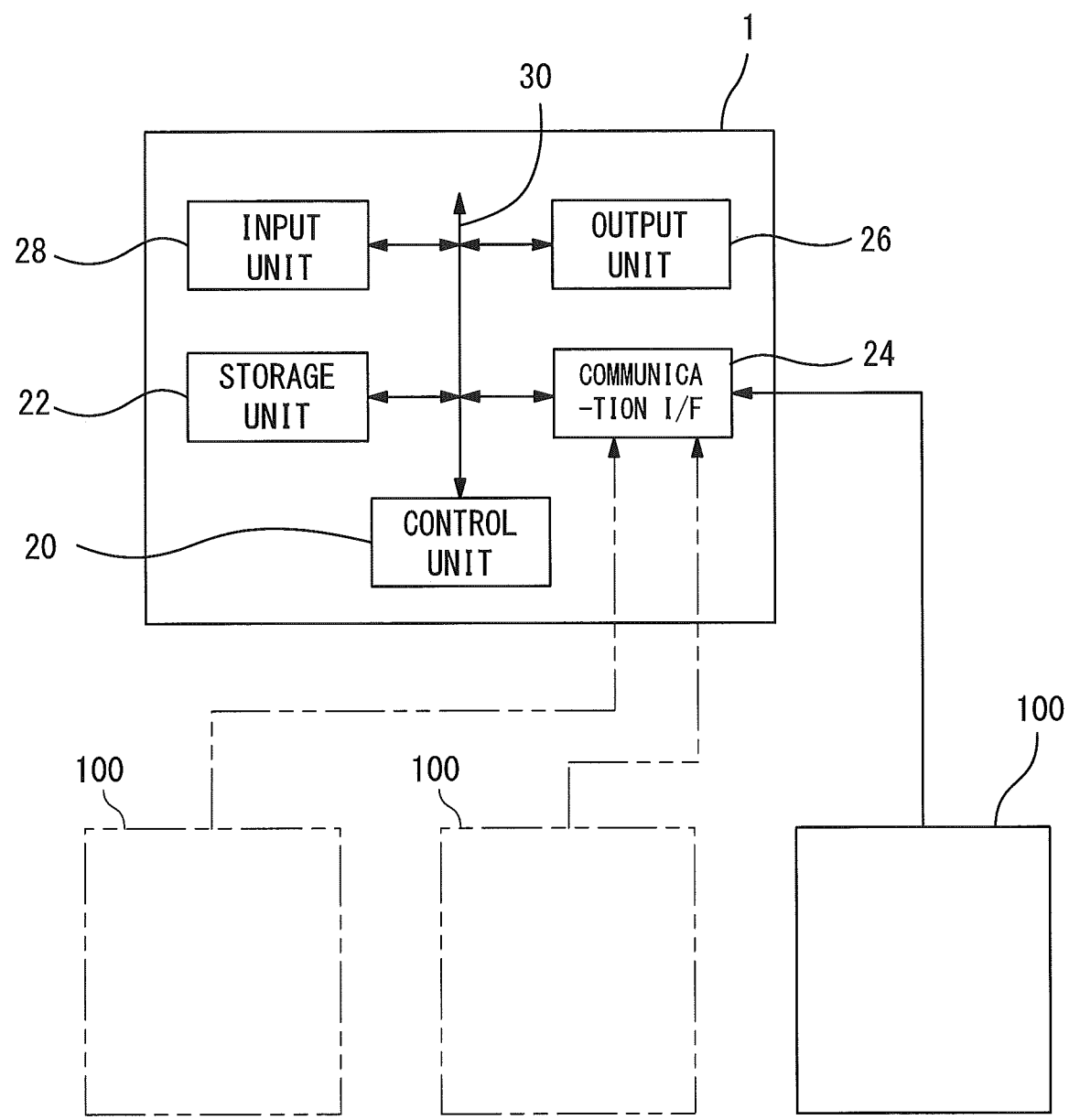
FIG. 1 is a block diagram of the physical structure of an operation monitoring device.
Figure 2:
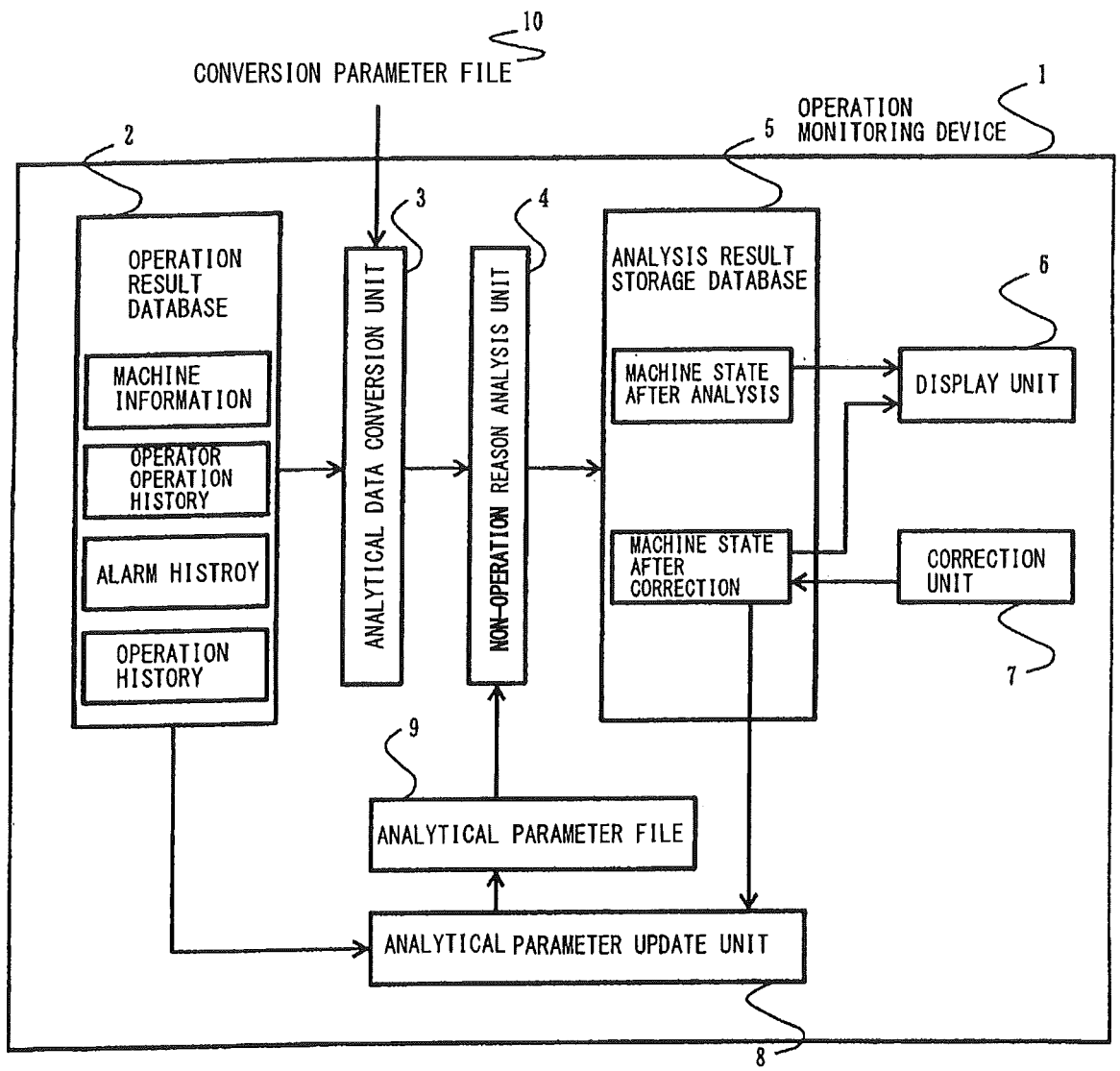
FIG. 2 is a block diagram of the functional structure of an operation monitoring device.

FIG. 1 is a block diagram of the physical structure of an operation monitoring device 1 disclosed in this specification. FIG. 2 is a block diagram of the functional structure of the operation monitoring device 1. In the description below, an operator of a machine 100 will be referred to as "an operator," while an operator of the operation monitoring device 1 will be referred to as "a user."

Initially, the physical structure of the operation monitoring device 1 will be described by reference to FIG. 1. The operation monitoring device 1 monitors the operation state of a machine 100 to be managed (or a target machine 100), and records the state monitored. The target machine 100 can be any machine without limitation. That is, the machine 100 can be an industrial machine used in a production site. In the description below, an example in which the machine 100 is a machine tool that processes workpieces is described.

A single operation monitoring device 1 may manage one or more machines 100. The machine 100 is connected by wire or radio to the operation monitoring device 1 and can exchange data with the operation monitoring device 1.

The operation monitoring device 1 includes a control unit 20 for various calculations, a storage unit 22 for storing various data and a control program, a communication interface 24 (hereinafter referred to as a "communication I/F 24") for communication with an external device (for example, the machine 100), an input unit 28 for receiving an operation by a user, an output unit 26 for outputting information to a user, and a data bus 30 that connects these components. The control unit 20 includes, for example, one or more CPUs and executes various calculations according to a control program stored in the storage unit 22. The storage unit 22 stores various data and a control program. The storage unit 22 is composed of, for example, a magnetic storage unit (for example, a hard disk drive) or a semiconductor memory device (for example, an SSD or an SD card). The storage unit 22 additionally stores a dedicated control program for having a computer to function as the operation monitoring device 1. The storage unit 22 stores an operation result database 2, an analysis result storage database 5, a conversion parameter file 10, and an analytical parameter file 9, or the like, all of which are to be described later.

The output unit 26 outputs various kinds of information to a user. The output unit 26 may include, for example, a display, a speaker, a printer, or a lamp. The input unit 28 receives an operation by a user. The input unit 28 may include a device for non-contact operation, such as a microphone or a camera, in addition to, or instead of, a device for operation with a hand, such as a keyboard, a mouse, or a touch panel.

Such an operation monitoring device 1 may be placed physically spaced apart from the machine 100. The operation monitoring device 1 may be a personal computer having a control program installed therefor or a portable information terminal device (a so-called portable phone, a smart phone, a tablet terminal, or the like). Alternatively, the operation monitoring device 1 may be incorporated in the target machine 100. In this case, the operation monitoring device 1 may not have a communication I/F 24 for communication with the machine 100.

The operation monitoring device 1 is not necessarily a physically single device but may include a plurality of devices placed physically apart from each other. For example, the machine 100 and an information terminal device capable of communication with the machine 100 together constitute a single operation monitoring device 1. Thus, for example, an instruction from a user may be received by a portable information terminal device, the machine 100 may execute processing in accordance with the instruction, and the result of processing may be displayed on the display unit of the information terminal device.

The following describes the functional structure of the operation monitoring device 1 with reference to FIG. 2. The operation monitoring device 1 includes the operation result database 2, an analytical data conversion unit 3, a non-operation reason analysis unit 4, the analysis result storage database 5, a display unit 6, a correction unit 7, an analytical parameter update unit 8, an analytical parameter file 9, and the conversion parameter file 10.

The operation result database 2 stores machine information concerning the structure, the dimensions, and the identification information (for example, the serial number or the manufacturing number of a machine) of each machine and the history information (that is, log data) of the machine 100. History information includes, for example, operator operation history, alarm history, and operation history. The operator operation history is the history of operations applied to the machine 100 by an operator. The operation history includes, for example, history of changes of running mode, operator operation mode, or processing program. The running mode indicates a mode in which the machine 10 is running. For example, in the case of the machine 100 being a machine tool, the running mode includes "an auto-running mode" and "a manual running mode." In the "auto-running mode," a processing program describing a series of machine operations for processing workpieces is executed so that the machine 100 operates automatically and continuously. Meanwhile, in the "manual running mode," the machine 100 is caused to operate step by step by a manual operation using a button or the like. The operator operation mode indicates what operation is applied to the machine 100. Specifically, in the case of the machine 100 being a machine tool, the operator operation mode includes, for example, "a tool setting mode" and a "parameter setting mode." In the "tool setting mode," a tool for use with the machine 100 is set and managed. Meanwhile, in the "parameter setting mode," a processing program for use by the machine 100 is set and managed. Each of the operator operation history, the alarm history, and the operation history includes information outputted from a control unit or the like of the machine 100 and the relevant time of the output. In addition to, or instead of, the above-mentioned operator operation history, alarm history, and operation history, the history information may include other information. For example, the history information may include records of detections made by various sensors mounted in the machine 100 or information on tools, jigs, and processing programs or the like used in processing.

Depending on the types of the target machines 100 for monitoring, completely different kinds of information from those mentioned above may be included in the history information.

The analytical data conversion unit 3 converts the machine information and history information (for example, the operator operation history, the alarm history, and the operation history) outputted from the operation result database 2 into analytical data for use in analysis of the state of a machine (or a machine state) to be described later, and outputs the same to the non-operation reason analysis unit 4. That is, the analytical data conversion unit 3 functions as an "analytical data obtaining unit" that obtains analytical data. The conversion (obtaining) into analytical data is executed when an instruction to analyze a machine state is issued. An instruction to analyze a machine state may be outputted in response to a user's operation or may be automatically outputted by the operation monitoring device 1, based on the time and date or the elapsed period of time, in addition to, or instead of, a user's operation. That is, an instruction to analyze a machine state may be regularly outputted at a predetermined interval, at a predetermined time and date, or after elapse of a predetermined or longer period of time after a reference event. Reference events may include, for example, execution of previous analysis processing or turning on of the machine 100.

The storage unit 22 stores the analytical parameter file 9 that indicates a condition for conversion into analytical data. As conversion condition includes, for example, the times and dates of the beginning and end of a period for analysis (or an analysis target period) and data items stored in the operation result database 2 and to be used in analysis. The analytical data conversion unit 3 outputs as analytical data only data in agreement with the conversion condition recorded in the analytical parameter file 9. Of the content of the analytical parameter file 9, the analysis target period may be desirably changed in response to a user's instruction or may be automatically set in agreement with the time of analysis. For automatic setting of an analysis target period, the analysis target period may be set based on time, such as "from twelve hours ago to the present," or a predetermined event, such as "from the last turning on of the machine 100 to the present." As to data item for use in analysis, in the case where the non-operation reason analysis unit 4 to be described later always uses the same analysis algorithm, in principle, the same data item will be used for analysis. Meanwhile, in the case where an analysis algorithm to be used is changed, the data item to be extracted as analytical data is desirably changed accordingly.

Based on the analytical data from the analytical data conversion unit 3 and with reference to the analytical parameter file 9, the non-operation reason analysis unit 4 analyzes the machine state for every predetermined time. The machine state includes an operating state in which a machine is operating and a non-operating state in which a machine is not operating. The non-operating state is classified into a plurality of kinds of non-operating states based on the reason for non-operation. For example, in the case of the machine 100 being a machine tool, the non-operating state can be classified into seven kinds of machine states; namely, "workpiece set-up," "tool set-up," "jig set-up," "program preparation," "halt in processing," "absence of operator," and "others." Thus, the non-operation reason analysis unit 4 can be rephrased as a unit that determines a reason why the machine 100 is not operating when the machine 100 is in a non-operating state. The above-mentioned seven kinds of reasons for non-operation are mere examples and may be desirably changed. The number of the kinds of the reasons may be greater or fewer than seven. In the storage unit 22, the analytical parameter file 9 to be referred to by the non-operation reason analysis unit 4 in analysis is stored. The analytical parameter file 9 is a file that records information to which reference is made in analysis.

The analysis algorithm for use in analysis of a machine state can be any algorithm without limitation. This allows, for example, use of artificial intelligence, or AI, in analysis of a machine state. In this case, the analytical parameter file 9 includes a function and a parameter necessary for the AI to analyze a machine state based on analytical data. The function and parameter are desirably modified as the AI learns.

Alternatively, a determination rule may be determined in advance for every machine state, and the non-operation reason analysis unit 4 may determine a machine state, based on the determination rule. The determination rules may include, for example, "in the case where a period with no operation lasts for more than a predetermined period of time, it is determined that an operator is absent," "in the case where an operator operates after alarming, it is determined that the machine has stopped operating due to alarming," or the like. In any case, the result of analysis (or an analysis result) by the non-operation reason analysis unit 4 is outputted to the analysis result storage database 5.

A machine state determined with respect to a single time or a single time band is not limited to one kind. That is, the non-operation reason analysis unit 4 may determine one or more candidates for the machine state and the probability of the candidate for every predetermined time. For example, a plurality of candidates for the machine state may be determined, such as "tool set-up" (probability of 55%), "program preparation" (probability of 25%), and "halt in processing" (probability of 12%), as a plurality of candidates for the machine state at a certain time.

In analysis, the following may be taken into consideration. For example, as to "non-operation due to wait," a machine may await due to absence of an operator. An operator may be absent because the processing has been completed with no more operation left or because an alarm has rung with no more operation expected. As to "loss due to halt," the machine may stop operating despite an operator's operation after alarming. As to "loss due to set-up," there may be considered jig or tool preparation, an operator operation mode for program preparation, the content of an operator operation, a running mode for attachment or removal of a workpiece, an operator operation mode, or the like.

Figure 4:
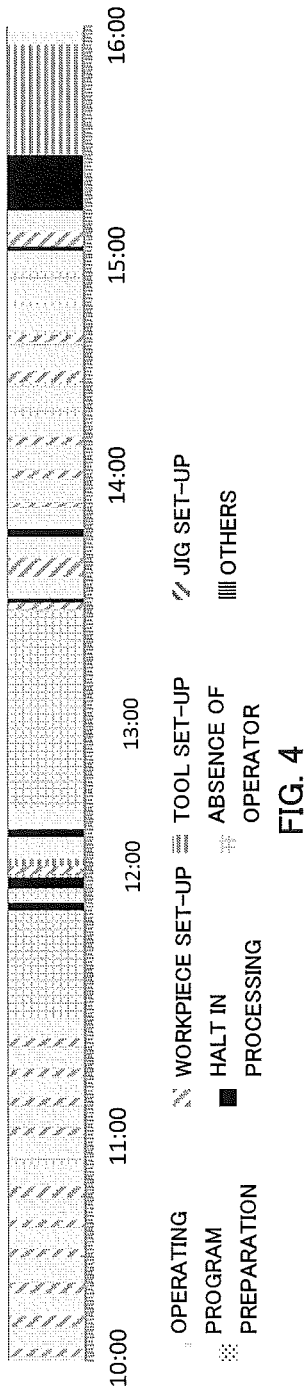
FIG. 4 illustrates a band graph as another example of display of the result of analysis performed by the operation monitoring device.

In the storage unit 22, the operation result storage database 5 as well is stored. In the analysis result storage database 5, the machine state at each predetermined time is stored as an analysis result. The display unit 6 (the output unit 26) displays the analysis result to present to an operator. In the case where a probability is calculated for every machine state at each predetermined time, such as when AI is used for analysis, the probability as well is stored as the analysis result. FIG. 3 and FIG. 4 illustrate one example of display of the analysis result. Specifically, FIG. 3 illustrates a table showing the accumulated period of time for every kind of machine state and its percentage. FIG. 4 illustrates a band graph with the abscissa as time, the graph showing in which of the states, including "operating," "workpiece set-up," "tool set-up," "jig set-up," "program preparation," "halt in processing," "absence of an operator," and "others," the machine 100 is at each predetermined time. Such display allows a user to readily recognize the detailed analysis information. The display formats in FIG. 3 and FIG. 4 are mere examples and can be desirably changed. For example, instead of the display format (a table) in FIG. 3, there may be displayed a circle graph showing the percentages, in time, of the respective machine states. In displaying a machine state for every predetermined time, as illustrated in FIG. 4, the probability of the machine state may be additionally displayed. Additional display of the probability allows a user to readily identify a time band with a machine state estimated with low accuracy and thus a time band that highly likely requires correction of the analysis result.

Unfortunately, the machine state determined by the non-operation reason analysis unit 4 may fail to accord with the actual state of the machine despite the above-mentioned analysis. In such a case, a user can correct the analysis result recorded in the analysis result storage database 5 by operating the input unit 28. Specifically, upon receipt of a user's correction instruction, the correction unit 7 corrects the analysis result. The analysis result before correction and the analysis result after correction are distinguishably stored in the analysis result storage database 5 as "the machine state after analysis" and "the machine state after correction," respectively. Both "the machine state after analysis" (the analysis result before correction) and "the machine state after correction" (the analysis result after correction) are displayed to be presented to a user.

Correction may be instructed in any manner without limitation. Specifically, for instruction correction, for example, a user may designate "the start time" and the "end time" of a period which the user wishes to correct and "the kind of a state" that is the machine state after correction. A user may input a reason for correction when necessary in addition to the content of correction. FIG. 5 illustrates one example of correction data inputted by a user. "The kind of a state" after correction may be inputted by a user by inputting letters, or selected from among alternatives in a list displayed on a screen. In the latter case, alternatives corresponding to the same kinds of reasons determined by the non-operation reason analysis unit 4 are determined. When AI is used for analysis, machine states may be listed beginning with one with the highest probability as the machine state at each predetermined time. This arrangement can provide a reference for a user to refer to in selection of the kind of the aimed state.

Figure 6:
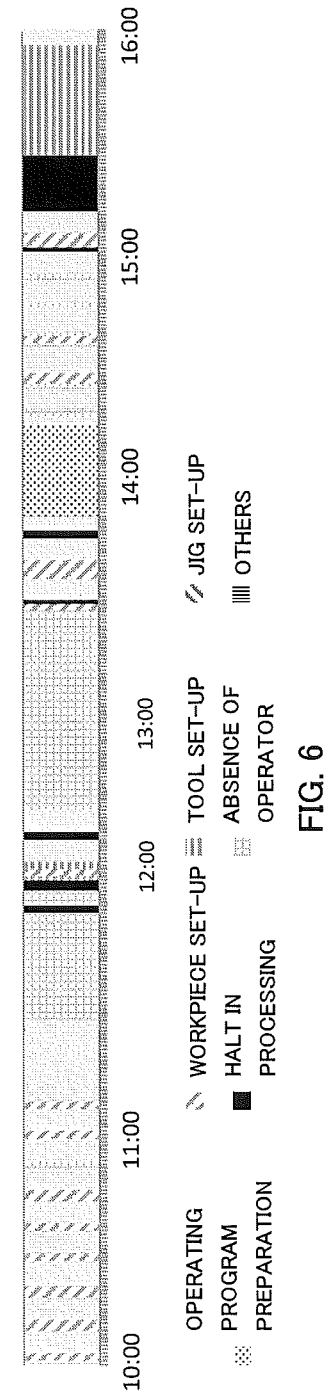
FIG. 6 illustrate a band graph showing machine states after manual correction performed by a user to the result illustrated in FIG. 4.

FIG. 6 illustrates one example of "the machine state after correction" (the analysis result after correction) when the correction illustrated in FIG. 5 is made. As is obvious from comparison between the results in FIG. 4 and FIG. 6, respectively, with execution of the correction illustrated in FIG. 5, the machine state for the period from 11:15 to 11:30 is corrected from a repeat of the "workpiece set-up" state and the "operating" state before correction (FIG. 4) to all the "operating" state after correction (FIG. 6). The correction further corrects the machine state for the period 13:50 to 14:15 from a repeat of the "workpiece set-up" state and the "operating" state before correction (FIG. 4) into all "program preparation" after correction (FIG. 6). In FIG. 3, the column of the "update result" indicates the accumulated period of time of each kind of machine state after correction and its percentage. As is obvious from FIG. 3, execution of the correction illustrated in FIG. 5 increases the accumulated period of time of the "program preparation" state and decreases those of the "operating" state and the "workpiece set-up" state.

Figure 9:
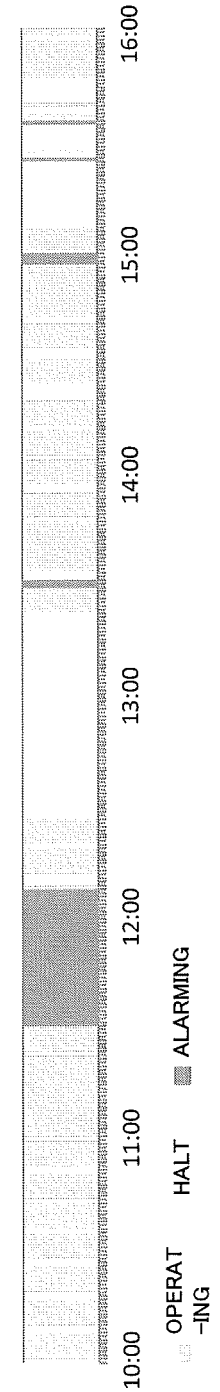
FIG. 9 illustrate a band graph showing, in terms of time, the result of analysis performed by a conventional factory operation monitoring device.

The analysis results illustrated in FIG. 4 and FIG. 6 are displayed at the same time on a single screen. This allows more accurate understanding of the operation state. In this case, a conventional simple graph, such as is one illustrated in FIG. 9, may be simultaneously displayed. In the case where the analysis result is corrected, naturally, it may be the case that only the analysis result after correction is displayed and the analysis result before correction is not displayed.

In response to an instruction to update the analytical parameter file 9, the analytical parameter update unit 8 corrects, and thereby updates, the analytical parameter file 9. Specifically, based on "the machine state after correction" outputted from the analysis result storage database 5 and the machine information and history information (for example, the operator operation history, the alarm history, and the operation history) outputted from the operation result database 2 and used in analysis, the analytical parameter update unit 8 calculates again a parameter necessary for the analysis such that the non-operation reason analysis unit 4 outputs "the machine state after analysis" the same as "the machine state after correction." Then, based on the re-calculated parameter, the analytical parameter update unit 8 outputs an analytical parameter file 9 for replacement of the existent analytical parameter file 9. In using AI for analysis, "the machine state after correction," or the analysis result after correction, and the analytical data used in analysis can make teacher data for the AI to learn. As described above, correction of the analytical parameter file 9 in accordance with the content of correction can further enhance the accuracy in analysis.

An instruction to update the analytical parameter file 9 may be outputted every time correction is made to the analysis result or in response to a user's operation. Alternatively, the update instruction may be automatically outputted from the operation monitoring device 1. In this case, the operation monitoring device 1 may output an update instruction based on time, such as time and date or an elapsed period of time, or upon occurrence of a specific event (for example, when the activation button of a machine is turned on).

Figure 7:
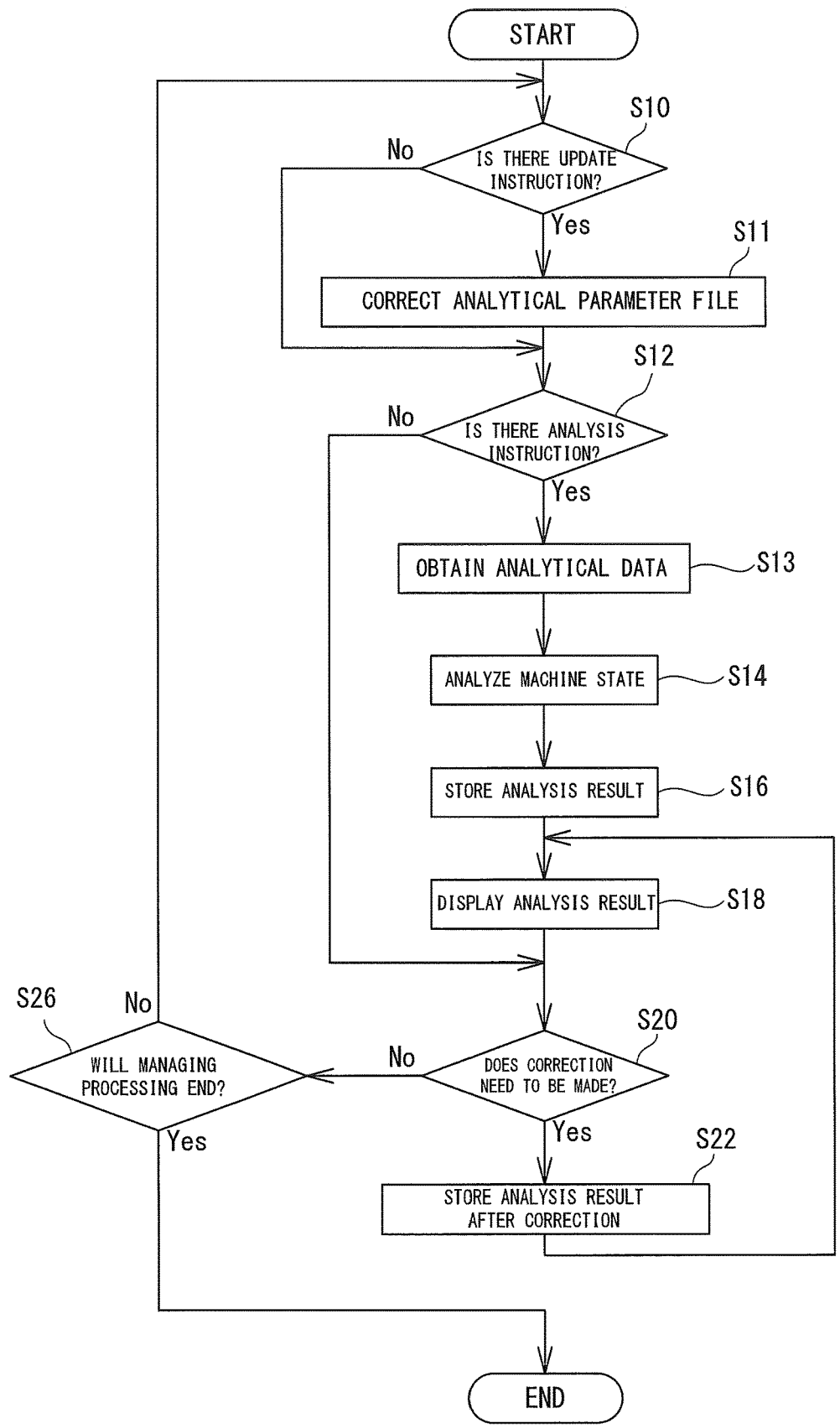
FIG. 7 is a flowchart of managing processing for a machine by an operation monitoring device.

The following describes the flow of the processing for managing the machine 100 by the conversion parameter file 10 with reference to FIG. 7. FIG. 7 is a flowchart of the managing processing. The control unit 20 of the operation monitoring device 1 executes history collection processing by collecting history information (for example, the operator operation history, the alarm history, and the operation history) at random and storing the same in the operation result database 2 (the storage unit 22). In parallel with the history collection processing, the control unit 20 executes the managing processing illustrated in FIG. 7. In the managing processing, initially, a determination is made as to whether there is an instruction to update the analytical parameter file 9 (S10). The update instruction may be outputted in response to a user's operation or may be automatically outputted by the operation monitoring device 1, based on time information or the like, as described above. An update instruction may be outputted interlinking with a correction instruction (S20) to be described later. In absence of an update instruction, the operation flow proceeds to step S12. Meanwhile, with presence of an update instruction, the analytical parameter update unit 8 (the control unit 20) corrects the analytical parameter file 9, based on "the machine state after correction" stored in the analysis result storage database 5 and the machine information and the history information both used in the analysis, and then stores the corrected file as a new analytical parameter file 9.

In step S12, a determination is made as to whether there is an analysis instruction to analyze a machine state. The analysis instruction may be outputted in response to a user's operation or may be automatically outputted by the operation monitoring device 1, based on time information or the like, as described above. In absence of an analysis instruction, the control unit 20 proceeds to step S20. Meanwhile, with presence of an analysis instruction, the analytical data conversion unit 3 (the control unit 20) obtains analytical data (S13). Specifically, the analytical data conversion unit 3 extracts, as analytical data, data in agreement with the condition recorded in the conversion parameter file 10 from the operation result database 2.

The non-operation reason analysis unit 4 (the control unit 20) analyzes the machine state for every predetermined time, based on the obtained analytical data and with reference to the analytical parameter file 9 (S14). The non-operation reason analysis unit 4 (the control unit 20) stores the obtained analysis result as "the machine state after analysis" in the analysis result storage database 5 (the storage unit 22) (S16).

The control unit 20 displays "the machine state after analysis" in an appropriate display format, such as that illustrated in FIG. 3 or 4, on the display unit 6 (the output unit 26) (S18).

Thereafter, the correction unit 7 (the control unit 20) determines whether there is an instruction to correct the analysis result (S20). With presence of a correction instruction, the correction unit 7 (the control unit 20) corrects the analysis result according to the correction instruction and stores the analysis result after correction as "the machine state after correction" in the analysis result storage database 5 (the storage unit 22) (S22). In other words, "the machine state after analysis" is stored intact; that is, without correction, in the analysis result storage database 5 (the storage unit 22).

After storage of "the machine state after correction," the control unit 20 returns to step S18, in which the analysis result is displayed on the display unit 6 (the output unit 26). In the above, the respective analysis results before and after correction; that is, "the machine state after analysis" and "the machine state after correction," are both displayed. Then, a determination is made again as to whether there is a correction instruction (S20).

In absence of a correction instruction at step S20, a determination is made as to whether there is an instruction to end the ongoing managing processing (S26). With presence of a user's end instruction to end the managing process, the ongoing processing ends. Meanwhile, in absence of an end instruction, the operation flow returns to step S10 to repeat the above-mentioned processing.

The operation monitoring device 1 disclosed in this specification can be implemented, for example, using a typical personal computer. In this case, the display unit 6 is implemented using a display unit of the typical personal computer. The structure of the operation monitoring device 1 may be desirably changed, such as by changing the information format or software structure such that information can be stored in a format appropriate for analysis in the operation result database 2 before the analytical parameter is inputted into the non-operation reason analysis unit 4.

REFERENCE NOTE 1 operation monitoring device, 2 operation result database, 3 analytical data conversion unit (analytical data obtaining unit), 4 non-operation reason analysis unit, 5 analysis result storage database, 6 display unit, 7 correction unit, 8 analytical parameter update unit, 9 analytical parameter file, 20 control unit, 22 storage unit, 24 communication interface, 26 output unit, 28 input unit, 30 data bus, 100 machine.

The invention claimed is:

1. An operation monitoring device for managing a state of a machine tool, comprising:
    a storage unit;
    an output unit for outputting information to a user;
    an input unit for receiving an operation from the user; and
    a control unit,
    wherein
    the control unit:
        obtains analytical data that contain history information on the machine tool,
        analyzes the state of the machine tool, for a predetermined time, by classifying the state of the machine tool as an operating state or at least one non-operating state of a plurality of kinds of non-operating states, based on the analytical data, such that the operating state is a state in which the machine tool is operating, and the non-operating states are classified based on a reason for non-operation,
        stores a result of analysis in an analysis result storage database of the storage unit,
        presents the result of analysis stored in the storage unit to the user via the output unit, and
        corrects the result of the analysis stored in the storage unit according to an instruction inputted from the user via an input unit.

2. The operation monitoring device according to claim 1, wherein
    the control unit determines, for the analysis, one or more candidates for the state of the machine tool and a probability of-each of the candidates for a predetermined time, and presents the one or more candidates for the state of the machine tool to the user as correction candidates for the result of the analysis in order of a higher probability of the candidate.

3. The operation monitoring device according to claim 1, wherein
    the storage unit stores a result of the analysis before correction and a result of the analysis after the correction, and
    the output unit presents to the user both the result of the analysis before the correction and the result of the analysis after the correction.

4. The operation monitoring device according to claim 1, wherein
    the storage unit additionally stores an analytical parameter file that stores information to which reference is made for the analysis, and
    the control unit analyzes the state of the machine tool with reference to the analytical parameter file.

5. The operation monitoring device according to claim 4, wherein
    the control unit corrects the analytical parameter file in accordance with a content of correction to the result of the analysis.

6. A control program of an operation monitoring device for managing a state of a machine tool, the control program for causing the computer to execute:
    obtaining analytical data that contain history information on the machine tool;
    analyzing the state of the machine tool by classifying the state of the machine tool for a predetermined time as an operating state or at least one non-operating state of a plurality of kinds of non-operating states, based on the analytical data, the operating state being a state in which the machine tool is operating, and the non-operating states being classified based on a reason for non-operation;
    storing a result of analysis in a storage unit;
    presenting the result of the analysis stored in the storage unit to a user via an output unit; and
    correcting the result of the analysis stored in the storage unit according to an instruction from the user.

7. An operation monitoring device for managing a state of a machine tool, comprising:
    a storage unit;
    an output unit for outputting information to a user;
    an input unit for receiving an operation from the user; and
    a control unit,
    wherein
    the control unit:
        obtains analytical data that contain history information on the machine tool, and analyzes the state of the machine tool by classifying the state of the machine tool for a predetermined time as an operating state or at least one non-operating state of a plurality of kinds of non-operating states, based on the analytical data, the operating state being a state in which the machine tool is operating, and the non-operating states being classified based on a reason for non-operation,
        stores an analysis result storage database that stores a result of analysis in the storage unit,
        presents the result of analysis stored in the storage unit to the user via the output unit,
        corrects the result of the analysis stored in the storage unit according to an instruction inputted from the user via an input unit, and
        receives a reason for correction from the user.

* * * * *